United States Patent [19]

Romanski

[11] 4,298,858
[45] Nov. 3, 1981

[54] METHOD AND APPARATUS FOR AUGMENTING BINARY PATTERNS

[75] Inventor: John G. Romanski, Kingsville, Md.

[73] Assignee: The United States of America as represented by the Secretary of the Air Force, Washington, D.C.

[21] Appl. No.: 134,718

[22] Filed: Mar. 27, 1980

[51] Int. Cl.³ .................................... G06K 9/52
[52] U.S. Cl. ...................... 340/146.3 MA; 358/260
[58] Field of Search .......... 340/146.3 AG, 146.3 MA, 340/146.3 R; 358/260, 261, 262

[56] References Cited

U.S. PATENT DOCUMENTS

| | | | |
|---|---|---|---|
| 3,737,855 | 6/1973 | Cutaia | 340/146.3 AG |
| 3,761,876 | 9/1973 | Flaherty et al. | 340/146.3 MA |
| 4,047,152 | 9/1977 | Giuliano et al. | 340/146.3 MA |
| 4,119,947 | 10/1978 | Leighton et al. | 340/146.3 MA |
| 4,205,341 | 5/1980 | Mitsuya et al. | 340/146.3 AG |

OTHER PUBLICATIONS

Hall et al., "Analog Thresholding Scheme For Medium Resolution Scanners" *IBM Tech. Disc. Bulletin*, vol. 14, No. 6, Nov., 1971, pp. 1926–1927.

*Primary Examiner*—Leo H. Boudreau
*Attorney, Agent, or Firm*—Donald J. Singer; Willard R. Matthews, Jr.

[57] ABSTRACT

The conversion of simple "1" and "0" PIXELS of a binary pattern into PIXELS with numerical values dependent upon relative location in the original pattern is realized by a technique that identifies various types of PIXELS including the edge PIXELS in contiguous groups of "1" PIXELS. A multilevel pattern using the various types of PIXELS is developed and a numerical value assigned to each PIXEL. The numerical value for each PIXEL is a function of its own type and the types of its near neighbor PIXELS. Pattern measurements for the augmented pattern are less sensitive to erroneous cell deletions than for simple binary patterns. The technique is implemented by a simple mechanization for generating the augmented pattern. The mechanization is characterized by operations that are easily implemented in a real time environment using standard digital logic devices.

4 Claims, 4 Drawing Figures

METHOD AND APPARATUS FOR AUGMENTING BINARY PATTERNS

STATEMENT OF GOVERNMENT INTEREST

The invention described herein may be manufactured and used by or for the Government for governmental purposes without the payment of any royalty thereon.

BACKGROUND OF THE INVENTION

This invention relates to systems for converting linear video data into binary representation and in particular to a technique and means for processing binary patterns so as to improve pattern measurements.

There exist many schemes for converting linear video type data into simpler binary patterns. These are easier to manipulate and require less data storage. For instance, consider a portion of a video raster, P, which is quantized spatially into m × m picture elements (PIXELS), $P_{ij}$; i, j∈{0,1,2 ... m}. The video level, or intensity of each PIXEL is represented by a quantized digit or gray level where $P_{ij}$∈{0, g max}. For the sake of illustration, it will be assumed here that m=32 and g max=255. For this particular instance, 8×32×32=8192 bits of memory would be required to store this original image. On the other hand, if an algorithm is used to generate a binary pattern, the gray level information is compressed into a single bit. This binary pattern can be stored in a smaller memory, is easier to manipulate and requires less bandwidth for transmission. Needless to say, other reasons exist for converting linear video into a binary representation, in particular, separation of targets from background. In such schemes PIXELS which are determined by some algorithm to be representative of targets are replaced with a "1," the others are set to zero. Another scheme is to subject the gray level values of the individual PIXELS to a threshold test. PIXELS with gray level values greater than the threshold, $g_{th}$, are replaced by a "1" otherwise by a "0."

The binary pattern is useful for pattern measurements since it is often more representative of the true pattern geometry than the linear video which can be influenced by glints and temperature variations. Characteristics of the pattern are often expressed in terms of measured parameters. Measurements that are of special interest are the centroid (x,y) and the spatial variances ($\sigma x^2$, $\sigma y^2$, $\sigma xy$):

$$\overline{x} = \frac{1}{u} \sum_{i=0}^{m} \sum_{j=0}^{m} i P_{ij} \qquad (1)$$

$$\overline{y} = \frac{1}{u} \sum_{i=0}^{m} \sum_{j=0}^{m} j P_{ij} \qquad (2)$$

$$\sigma x^2 = \frac{1}{u} \sum_{i=0}^{m} \sum_{j=0}^{m} i^2 P_{ij} - \overline{x}^2 \qquad (3)$$

$$\sigma y^2 = \frac{1}{u} \sum_{i=0}^{m} \sum_{j=0}^{m} j^2 P_{ij} - \overline{y}^2 \qquad (4)$$

$$\sigma xy = \frac{1}{u} \sum_{i=0}^{m} \sum_{j=0}^{m} ij P_{ij} - \overline{xy} \qquad (5)$$

where:

$$u = \sum_{i=0}^{m} \sum_{j=0}^{m} P_{ij} \qquad (6)$$

By way of illustration, consider a binary pattern consisting of a single line of "1" PIXELS, $P_{ki}$, for i=0 through n.

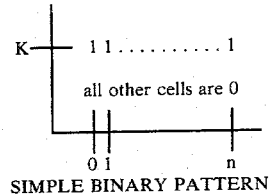

SIMPLE BINARY PATTERN

The x centroid coordinate is given by equations one and six as:

$$\overline{x} = \frac{n(n+1)/2}{n+1} + 5 = \frac{n}{2} + .5 \qquad (7)$$

Note the strong dependence on the length of the line of ones. Now, if the original linear pattern is noisy, the resulting binary pattern may not be a good representation. This is particularly true if a thresholding technique is used to form the modified pattern. Cells whose gray level value is near the threshold will have their gray levels altered by the noise in a manner such that they can appear or disappear from frame to frame, even though the object does not change. PIXELS near the edge of the pattern are particularly sensitive. In such cases the deletion or addition of a simple binary cell will cause the centroid to shift by ½ element. For many applications, such errors are intolerable. The present invention comprehends a procedure and an apparatus for implementing this procedure that generates a multilevel or augmented pattern which is less sensitive to the erroneous deletion and/or addition of cells. The method identifies and classifies cells according to their location with respect to the edge of the pattern. All cells composing the pattern are then assigned a value between 0 and 31 depending upon their type and the cell type of the four closest adjoining cells. What results is a pattern of PIXELS with values assigned on the basis of relative location. These values may be interpreted, in a loose sense, as probabilities that a given PIXEL is part of a pattern. Since the edge cells which are more likely to be misassigned, are given less weight, the pattern measurements tend to remain more stable.

SUMMARY OF THE INVENTION

The invention comprehends a means of processing simple binary patterns so as to improve pattern measurements. The resulting augmented patterns have PIXEL values that are dependent solely upon relative geometrical location with respect to the initial binary pattern. The invention is realized by a technique that identifies and locates various types of PIXELS in the original binary pattern and weighs them numerically in accordance with their own PIXEL type and the PIXEL types of their neighbors. This is accomplished by: locating by row and column scans, and designating as "T" type PIXELS, the PIXELS at the edges of each contiguous group of "1" type PIXELS in the rows and columns of the original binary pattern; locating and designating as "P" type PIXELS the PIXELS created by the Exclusive OR of "1" type PIXELS in row and column scan intermediate patterns; developing an intermediate pattern of "0," "1," "T" and "P" type PIXELS; and, assigning a numerical value to each PIXEL in the intermediate pattern. The numerical values are derived by considering each PIXEL as a base PIXEL and inputting the logical value of its type into a PIXEL Weight table; sequentially assessing the logical values of each of the four near neighbor PIXELS of the base PIXEL and inputting those values into the weight table; deriving from the weight table a numerical value for each of the four combinations of base PIXEL and near neighbor PIXELS; and accumulating those minimum values to provide the augmented pattern PIXEL value. Mechanization of the invention is characterized by operations that are easily implemented using standard digital logic devices.

It is a principal object of the invention to provide a new and improved method for augmenting binary patterns.

It is another object of the invention to provide new and improved apparatus for augmenting binary patterns.

It is another object of the invention to provide augmented binary patterns that are less sensitive to edge cell deletion than simple "0" and "1" type binary patterns.

It is another object of the invention to generate from a simple binary pattern an augmented binary pattern that provides improved data upon which to base pattern measurements.

These together with other objects, features and advantages of the invention will become more readily apparent from the following detailed description when taken in conjunction with the illustrative embodiment in the accompanying drawings.

DETAILED DESCRIPTION OF THE PREFERRED EMBODIMENT

Figure 1:
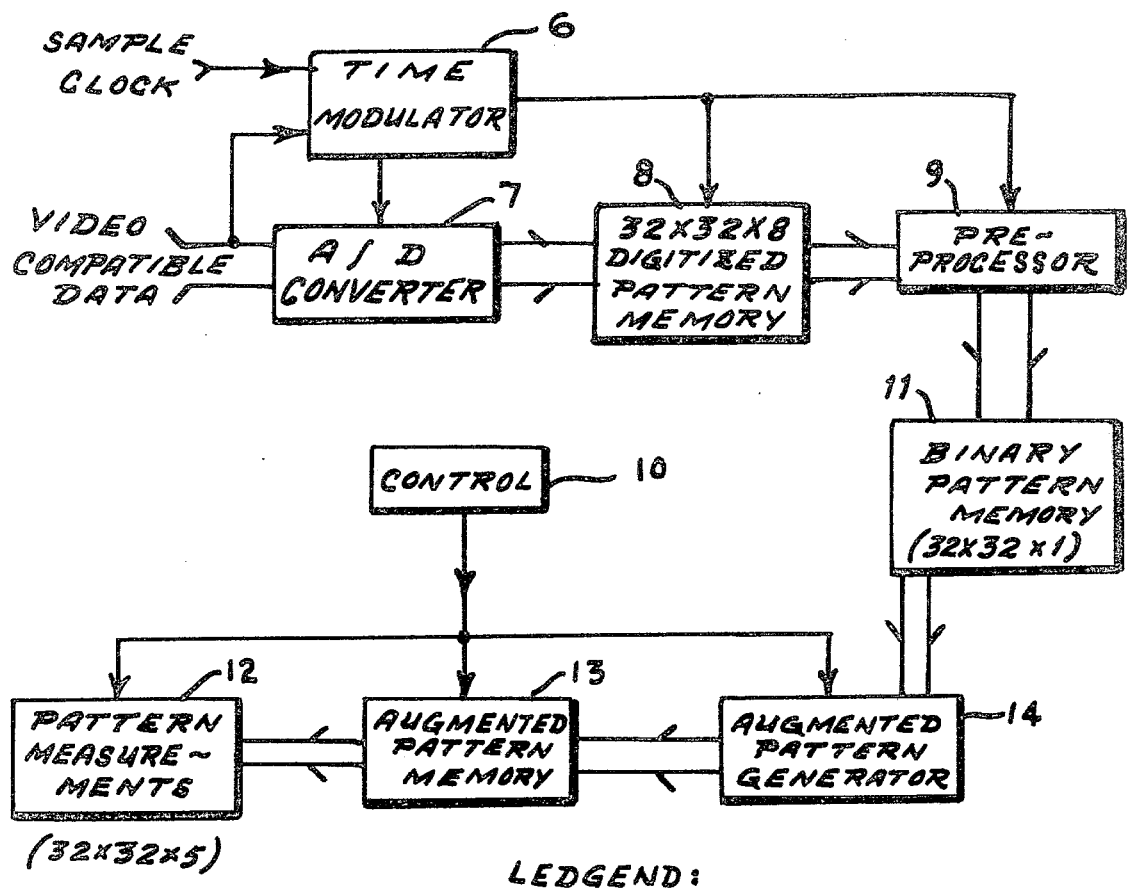
FIG. 1 is a block diagram illustrating the operating environment of the augmented pattern generator of the invention.

The operating environment of the augmented pattern generator of the invention is illustrated in FIG. 1 wherein essential elements and functions are shown in block diagram form and wherein the control paths and pattern data paths are designated respectively by single and double interconnecting lines.

The augmented pattern generator requires a binary pattern as input. This is provided by means of time modulator 6, A/D converter 7, digitized pattern memory 8, processor 9, and binary pattern memory 11. Video compatible data from a sensor is digitized into a gray level by the analog to digital convertor 7. Time modulator 6, driven by a sample clock and derived sync from the video data, controls the timing of the digitization which is equivalent to a spatial quantization of the raster. It also provides address data for the digitized pattern memory 8, which retains the converted video of the raster segment of interest, and timing signals (if required) for the initialization of the preprocessing algorithm. The preprocessor 9 executes an algorithm which converts the multi-gray level digitized representation into a binary pattern, 1 bit per PIXEL. The details of the operation of the preprocessor are unimportant. It may be a simple thresholding device or it may perform a more complicated target designation function. The resulting output of the preprocessor 9 is retained in the binary pattern memory 11. The augmented pattern is generated by pattern generator 14 from this data and then made available for further processing e.g. pattern moment measurements by means of pattern memory 13 and pattern measurement means 12.

Central to the generation of the augmented pattern is the location of cells at the edge of a contiguous group of "1" cells in any given row or column of the binary pattern. Should any row or column contain more than one separate group of "1" cells, each such group is considered separately. The cells at the ends of each such group are designated "T" cells and they are found by the following procedure. The rows are scanned first. (This is not a requirement; scanning columns first will yield identical results.) For the i'th row of the binary pattern, if PIXELS $P_{ij}$ thru $P_{i\,j+n}$ are a continuous group of "1" cells, then the "T" cells are designated according to the number of cells in this group (n+1):

TABLE I

| n | "T" Cells |
|---|---|
| 0 | $P_{ij}$ |
| 1 | $P_{ij}, P_{ij+1}$ |
| 2 | $P_{ij}, P_{ij+n}$ |
| 3 | $P_{ij}, P_{ij+n}$ |
| ≧4 | $P_{ij}, P_{ij+1}, P_{i\,n-1}, P_{in}$ |

This is best illustrated by example. PATTERN 1 depicts a binary pattern and PATTERN 2 shows that the T cells produced by applying the rules of Table 1 to the rows of the pattern. The same operations are performed on each column to yield the "T" cells of PATTERN 3.

```
         1
        1 1 1
       1 1 1 1 1           All Other Cells are 0
        1 1 1
         1
       PATTERN 1
ORIGINAL BINARY PATTERN, P
```

```
      T           O              T           O
    T 1 T                       T 1 T
   T T 1 T T                   T 1 1 1 T
    T 1 T                       T T T
      T                           T
    PATTERN 2                  PATTERN 3
    ROW SCAN                   COLUMN SCAN
"T" Cells and Pattern $P^{(R)}$   "T" Cells and Pattern $P^{(C)}$
```

The "T" cells of the row and column scans are then used to derive a multilevel logical pattern, P, whose cells, $P_{ij}$, have one of four logical values: "0," "1," "T," and "P" representing a fourth type of cell. The PIXELS of P are defined as follows:

$$P_{ij} = 0; \quad P_{ij} = 0 \qquad (8)$$
$$1; \quad P_{ij}^{(R)} = P_{ij}^{(C)} = 1 | P_{ij} = 1$$
$$T; \quad P_{ij}^{(R)} = P_{ij}^{(C)} = T | P_{ij} = 1$$
$$P; \quad \{(P_{ij}^{(R)} = 1) \cdot (O_{ij}^{(c)} = T)\} +$$
$$\quad \{(P_{ij}^{(R)} = T) \cdot (P_{ij}^{(c)} = 1)\} | P_{ij} = 1$$

where + and • indicate the Boolean operations of logical OR and AND respectively. Thus a "p" cell is created by the Exclusive OR of "1" cells in the row and column scan intermediate patterns. PATTERN 4 depicts this resulting pattern.

```
        T   O
     T  P  T
  T P  1  P T
     T  P  T
        T
     PATTERN 4
  MULTILEVEL PATTERN; P
```

The next step is to use PATTERN 4 to derive the augmented pattern. This is accomplished as follows: each cell of the multilevel pattern, $\tilde{P}_{ij}$, is considered, in turn, as base cell. The logical value ("0," "1," "P" or "T") of this base cell serves as an input to a table. Next the logical values of the four nearest neighbors, $\tilde{P}_{i-1j}$, $\tilde{P}_{ij+1}$, $\tilde{P}_{i+1j}$ and $\tilde{P}_{ij-1}$, are sequentially accessed. These sequential values serve as additional inputs to the same table. The Table W provides a numerical value for each of the four combinations of base cell and neighbor. These values are accumulated to yield the value of the augmented pattern cell $A_{ij}$ corresponding to the initial base cell $\tilde{P}_{ij}$.

$$A_{ij} = W(P_{ij}\, P_{i-1j}) + W(P_{ij}\, P_{ij+1}) + W(P_{ij}\, P_{i+1j}) + W(P_{ij}\, P_{ij-1}) \quad (9)$$

Table I shows the values accumulated for each neighbor dependent upon the base cell value. Note that for base cells with a value of "0" or "1," the augmented value, $A_{ij}$, is independent of the neighbor cells. This is to insure that cells which have the highest probability of being target or background are not changed. This also enables some simplification in mechanization of the algorithm. As one final concession to practicality, the maximum accumulated value will be limited to 31 (instead of 32) in order to limit the number representation to five binary digits.

TABLE I
CELL WEIGHT TABLE

| Base Cell | Neighbor Cell | W (Base Cell, Neighbor Cell) | | | |
|---|---|---|---|---|---|
| | | 0 | 1 | P | T |
| 0 | | 0 | 0 | 0 | 0 |
| 1 | | 8 | 8 | 8 | 8 |
| P | | 0 | 8 | 4 | 2 |
| T | | 0 | 4 | 2 | 1 |

Applying the final phase of the augmentation algorithm, given by equation 7 and Table I, to the intermediate pattern, $\tilde{P}$ (PATTERN 4), yields the augmented pattern of PATTERN 5. Unlike the original binary pattern, all cells do not have the same value.

```
          2
        4 14 4
      2 14 31 14 2
        4 14 4
          2
       PATTERN 5
   FINAL AUGMENTED PATTERN
```

PIXELS Near the center of the pattern have larger weights than the edge cells. Being derived solely from the binary pattern and geometrical considerations, the cell values do not depend upon the intensity values of the original linear pattern. Because of this and the strong influence of the location of the binary pattern edges on the algorithm, the augmented pattern values, $A_{ij}$ can, in a loose sense, be interpreted as the probability (unnormalized) that the cell is a part of the target.

The advantages of the augmented pattern over the binary pattern are demonstrated by considering the effects of cell deletions on the pattern measurements. PATTERNS 6a and 6b depict the binary pattern of PATTERN 1 and the resultant augmented pattern when single edge cell is deleted.

Such deletions of cells cause changes in the values of the pattern moments. Table II tabulates the mean and spatial variances for the original binary and augmented patterns (PATTERNS 1 and 5) as well as the noisy patterns of PATTERNS 6a and 6b. Note that the shift in the x centroid coordinate is almost three times greater for the binary pattern than it is for the augmented pattern. Also there is a 7.1% and 8.4% change in the values of $\sigma_x^2$ and $\sigma_x^2$ respectively between the original and noisy binary patterns.

```
   y |                           y |
     |      1                      |        2
     |     1 1 1                   |      4 14 4
  0— | 1 1 1 1 0                0— | 2 14 31 12 0
     |     1 1 1                   |      4 14 4
     |      1                      |        2
     |_____                 |_____
     0          x                  0          x
   PATTERN 6a                    PATTERN 6b
   BINARY PATTERN              AUGMENTED PATTERN
   WITH DELETED                    FOR FIG. 8a
   EDGE CELL
```

TABLE II
PATTERN MEASUREMENTS

| Pattern | Pattern | x | ⁻y | $\sigma_x^2$ | $\sigma_y^2$ |
|---|---|---|---|---|---|
| Original Binary | 1 | 0 | 0 | 1.077 | 1.077 |
| Original Augmented | 5 | 0 | 0 | .5404 | .5404 |
| Noisy Binary | 6a | −.1667 | 0 | 1.0000 | 1.167 |
| Noisy Augmented | 6b | −.0561 | 0 | .5234 | .5421 |

The changes in the same measurements for the augmented patterns are 3.2% and 0.3% respectively. This example indicates the augmented patterns are less sensitive to spatial noise than their binary counterparts.

A few final comments are in order. The rules which define "T" cells are somewhat arbitrary. The thickness of these transition regions in patterns can be adjusted according to known point spread functions of various sensors. The values of the weight in Table I have been chosen with respect to ease of implementation. Spatial optimality constraints are not deemed to be important criteria. The entire augmentation scheme is to be used in conjunction with a preprocessor and a device to measure pattern moments. Therefore, great care has been taken to insure that all processing can be realized with simple logical operations. This will insure compatibility with the other processors and introduce minimal delay.

Figure 2:
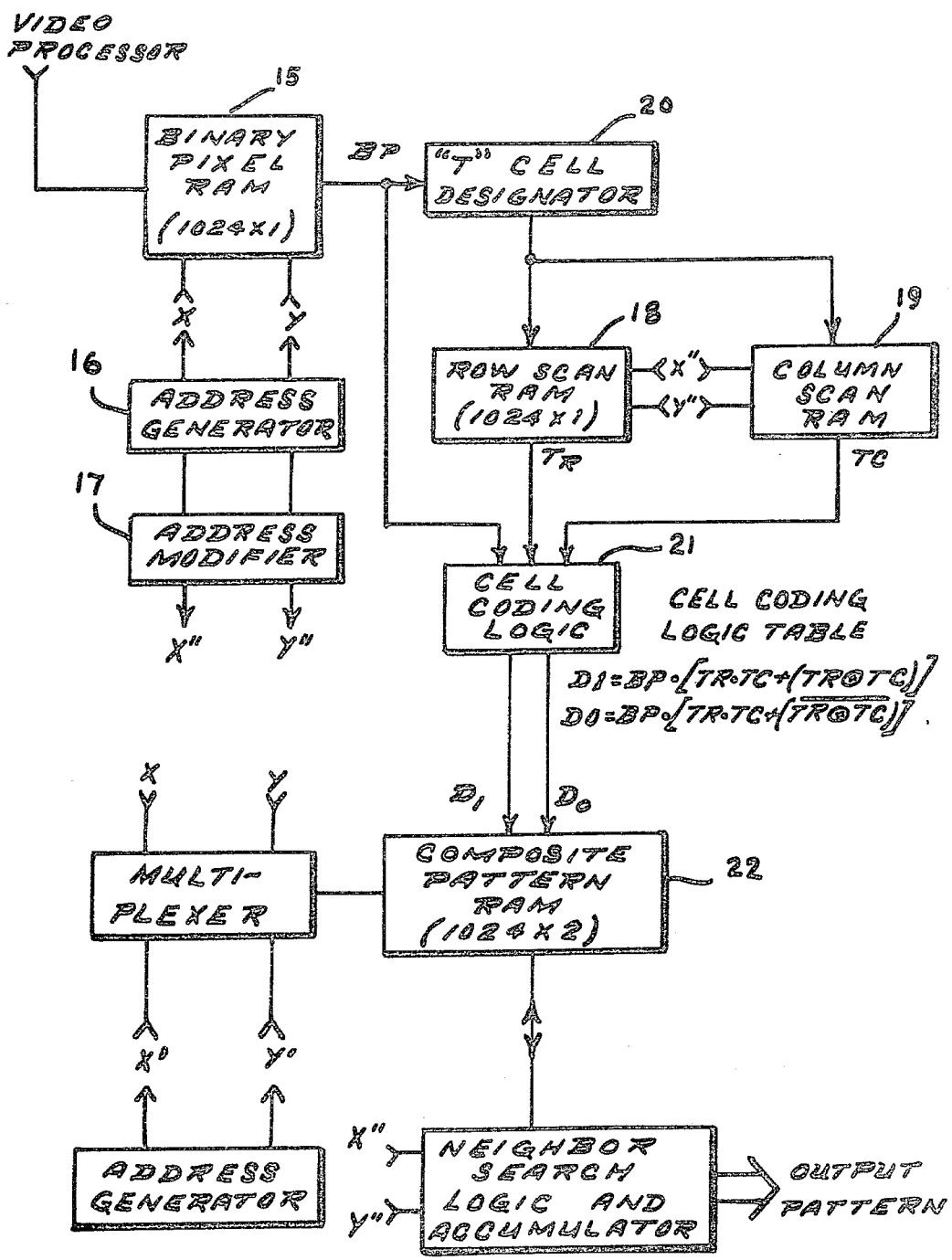
FIG. 2 is a block diagram illustrating the mechanization of the technique of the invention.

The mechanization of the augmentation algorithm is depicted in block diagram format in FIG. 2. The binary pattern is loaded by the preprocessor into the Binary PIXEL RAM 15. After this is accomplished T cells are determined by clocking PIXELS (BP) sequentially out of this memory first by rows and then by columns. The 1's and 0's pass through logic 21 which designates the presence of a T cell with a binary "1." This bit is stored in a RAM 22 corresponding to the scan format. An address generator 16 is required to generate address for the binary PIXEL RAM 15 for row and column scans. An address modifier 17 contains logic which adjusts the Binary PIXEL RAM 15 for the row and column scan RAMS 18, 19, since there is a four PIXEL delay in the "T" cell designator 20. Appropriate buffering and additional clock pulses are supplied by this device.

Figure 3:
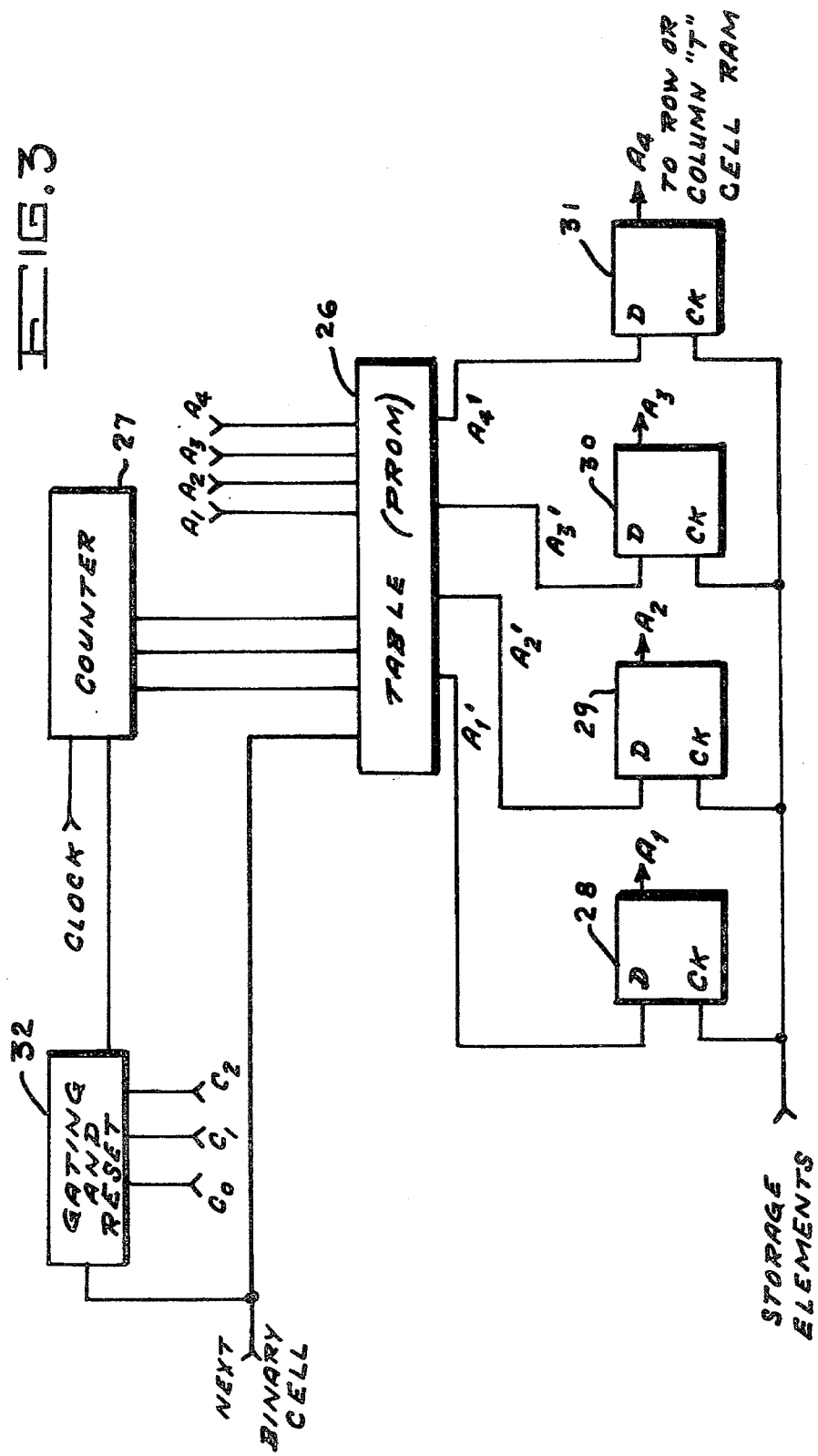
FIG. 3 is a block diagram illustrating details of the "T" cell designator of FIG. 2.

The T cell designator 20 consists of four cell storage elements, A1–A4 (e.g. D-Type Flip Flops 28–31) a logic table e.g. programmable read only memory 26 and a counter 27 and gating or reset circuit 32. This is depicted in the block diagram of FIG. 3. The counter tallies the number of consecutive 1's in any row or column segment of the binary pattern. Its maximum value is limited to a count of five since the rules for finding "T" cells remain unchanged above this value. The value of the counter, the value of the next binary cell and the present state of the storage elements are provided as inputs to a logic table, e.g. a programmable read only memory (PROM). The next PIXEL transition stores the present status of A4, which if set, indicates a T cell four positions earlier, in the appropriate scan RAM. The state of the storage elements are changed according to Table 3.

TABLE 3

| Next Cell Value | Counter Value | BEFORE TRANSITION | | | | AFTER TRANSITION | | | | Counter Value |
|---|---|---|---|---|---|---|---|---|---|---|
| | | A1 | A2 | A3 | A4 | A1 | A2 | A3 | A4 | |
| 0 | 0 | 0 | X | X | X | 0 | 0 | A2 | A3 | 0 |
| 1 | 0 | 0 | X | X | X | 1 | 0 | A2 | A3 | 1 |
| 0 | 1 | 1 | 0 | X | X | 0 | 1 | 0 | A3 | 0 |
| 1 | 1 | 1 | 0 | X | X | 1 | 1 | 0 | A3 | 2 |
| 0 | 2 | 1 | 1 | 0 | X | 0 | 1 | 1 | 0 | 0 |
| 1 | 2 | 1 | 1 | 0 | X | 1 | 0 | 1 | 0 | 3 |
| 0 | 3 | 1 | 0 | 1 | 0 | 0 | 1 | 0 | 1 | 0 |
| 1 | 3 | 1 | 0 | 1 | 0 | 1 | 0 | 0 | 1 | 4 |
| 0 | 4 | 1 | 0 | 0 | 1 | 0 | 1 | 0 | 0 | 0 |
| 1 | 4 | 1 | 0 | 0 | 1 | 1 | 1 | 0 | 1 | 5 |
| 0 | 5 | 1 | 1 | 0 | 1 | 0 | 1 | 1 | 0 | 0 |
| 1 | 5 | 1 | 1 | 0 | 1 | 1 | 1 | 0 | 0 | 5 |
| 0 | 5 | 1 | 1 | 0 | 0 | 0 | 1 | 1 | 0 | 0 |
| 1 | 5 | 1 | 1 | 0 | 0 | 1 | 1 | 0 | 0 | 5 |

X - Don't Care

Note that the sequence of operations defined by the table is similar to, but not exactly like a shift register. Care must be taken to insure that all information is loaded into the correct scan RAM.

Figure 4:
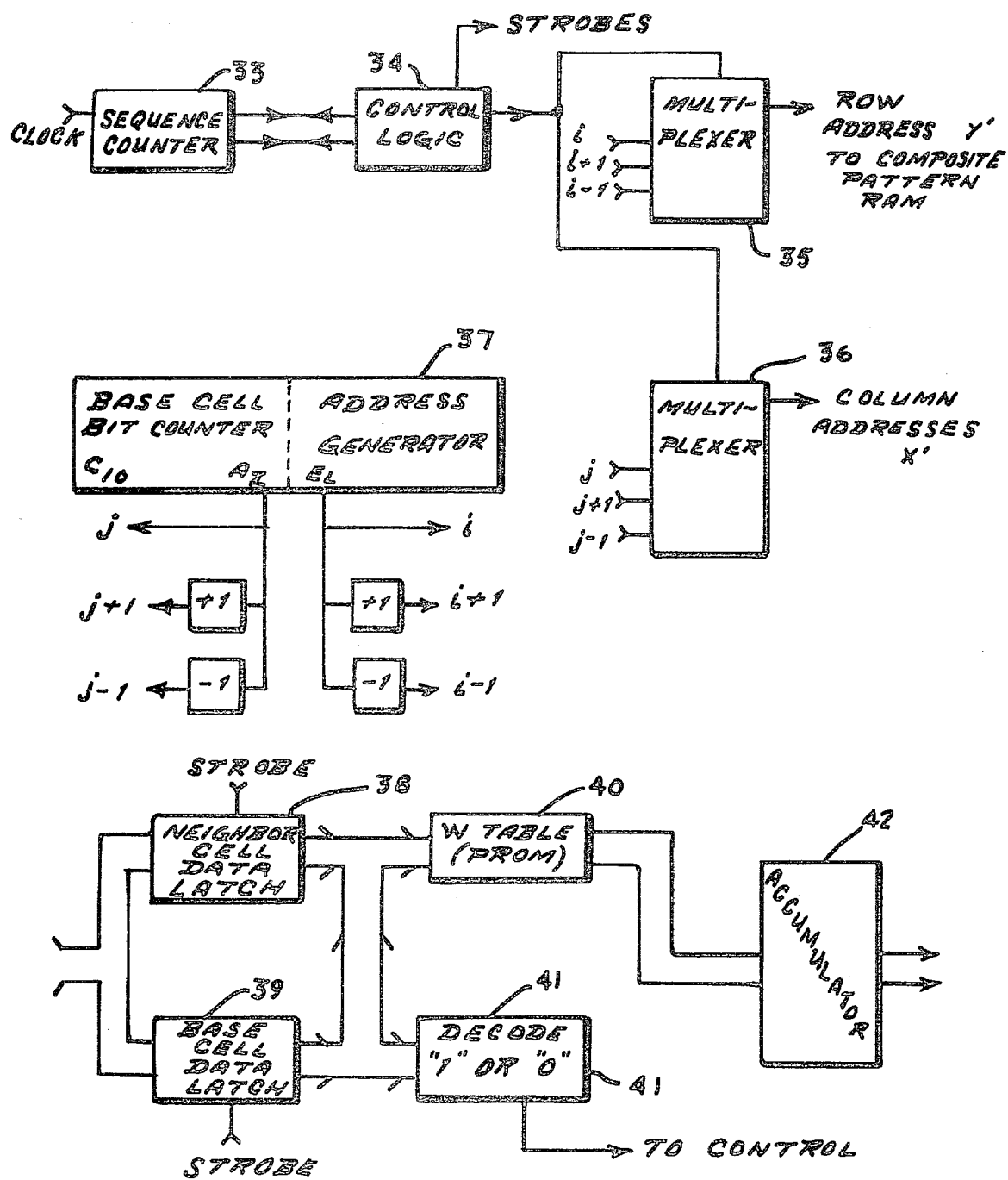
FIG. 4 is a block diagram illustrating the neighbor search logic function of FIG. 2.

Once the two scans that define "T" cells have been completed, the data in the two scan RAMS 18, 19 as well as the Binary Pattern RAM 15 is supplied to logic 21 which detects "P" cells. The logic also codes the type of all cells according to Table 4 and loads this information into the composite pattern RAM 22. This is the operation equivalent to the generation of PATTERN 3. Once this RAM is loaded, the final phase of the processing begins as shown by FIG. 4. The functions and components utilized are shown in block diagram form and comprise sequence counter 33, control logic 34, multiplexers 35, 36, counter 37, latches 38, 39, PROM 40, decoder 41 and accumulator 42.

TABLE 4

| TYPE | CELL CODES | |
|---|---|---|
| | D0 | D1 |
| 0 | 0 | 0 |
| "1" | 1 | 0 |
| "P" | 0 | 1 |

TABLE 4-continued

| TYPE | CELL CODES | |
|---|---|---|
| | D0 | D1 |
| "T" | 1 | 1 |

The composite pattern RAM 22 is accessed five cells at a time. A ten bit counter 37 is used as an address generator for a base cell ($\tilde{P}_{ij}$) address which access the base cell and latches its value. This is changed at the end of a five count sequence. If base cell value is such that no neighbor cell searches are required, logic is provided to terminate sequence immediately and begin on a new base cell. If neighbor cell information is required, logic is provided to modify the base cell address and generate all neighbor coordinates. This is controlled by a sequence counter 33 and multiplexers 35, 36. Once the address for the composite pattern RAM 22 is formed and applied to the memory the accessed data is stored in the neighbor cell latch 38. (Logic is provided to enable the system to skip cells over the edge boundaries.) This value, along with the base cell value is led to a logic table 40, e.g. a PROM which is the binary realization of Table I. This determines the incremental weight to be stored in the accumulator 42. At the end of the five count cycle, this accumulator contains the augmented pattern value which is made available for further processing.

The mechanization described above seems more complicated than what is actually required. Integrated circuit memories are available in a 1024 words by 1 data bit organization. Thus all memory requirements could be met utilizing 5 integrated circuit packages. Using available MSI devices, the entire process would consist of approximately 25 standard packages. Using a basic clock rate of 10 MHz, the entire augmentation process could be completed in less than a millisecond. This is a small delay when viewed in light of the improvement in the accuracy of the pattern measurements.

While the invention has been described in terms of its preferred embodiment it is understood that the words which have been used are words of description rather than words of limitation and that changes within the purview of the appended claims may be made without departing from the scope and spirit of the invention in its broader aspects.

What is claimed is:

1. An augmented pattern generator for providing a pattern of binary PIXELS having discrete numerical values from a simple binary pattern of "1" and "0" type PIXELS arranged in rows and columns, said augmented pattern generator comprising
   a binary pattern memory receiving simple binary pattern "1" and "0" type PIXEL data,
   a "T" type PIXEL designator circuit locating and designating as "T" type PIXELS the PIXELS at the edge of each contiguous group of "1" type PIXELS in the rows and columns of the simple binary pattern, the simple binary pattern PIXELS being sequentially clocked out of said binary pattern memory and scanned by said "T" type PIXEL designator circuit by rows and columns,
   a PIXEL coding logic circuit receiving "0" and "1" type PIXELS from said binary pattern memory and "T" type PIXELS from said "T" type PIXEL designator circuit and locating and designating "P" type PIXELS therefrom, said "P" type PIXELS being created by the Exclusive Or of the "1" type PIXELS in row and column scan intermediate patterns, said PIXEL coding logic circuit also coding "1," "0,""T" and "P" PIXEL types, a composite pattern memory receiving the coded output of said PIXEL coding logic circuit, a neighbor search logic circuit accessing said composite pattern memory and processing each PIXEL received therefrom by assigning thereto a numerical value that is a function of that PIXEL'S type and the type of its four near neighbor PIXELS, and an accumulator receiving the output of said neighbor search logic circuit.

2. An augmented pattern generator as defined in claim 1 wherein said "T" type PIXEL designator circuit comprises a counter operating on the system clock and receiving binary pattern "1" and "0" type PIXELS from said binary pattern memory, a logic table receiving the output of said counter and binary pattern "1" and "0" type PIXELS from said binary pattern memory, a multiplicity of PIXEL storage elements receiving the output of said logic table, a PIXEL row scan memory, and a PIXEL column scan memory, said row scan and column scan memories receiving the outputs of said PIXEL storage elements and feeding said PIXEL coding logic circuit.

3. An augmented pattern generator as defined in claim 2 wherein said PIXEL coding logic circuit develops coded outputs D1, D0 in accordance with the coding logic table $$D1 = BP \cdot [TR \cdot TC + TR \oplus TC]$$
$$D0 = BP \cdot [TR \cdot TC + \overline{TR \oplus TC}]$$

wherein TR is "T" type PIXEL row scan data, TC is "T" type PIXEL column scan data and BP is binary PIXEL.

4. An augmented pattern generator as defined in claim 3 wherein said neighbor search logic circuit includes a counter means utilized as an address generator for address and latch of each PIXEL as a base PIXEL, a sequence counter and multiplexer circuit controlling the operation of said counter means, a neighbor PIXEL data latch, a base PIXEL data latch, and a logic table receiving data from said neighbor PIXEL data latch and said base PIXEL data latch and supplying data to said accumulator.

* * * * *